(12) United States Patent
Nakamura et al.

(10) Patent No.: US 10,054,509 B2
(45) Date of Patent: Aug. 21, 2018

(54) PRESSURE DETECTION DEVICE

(71) Applicants: CITIZEN FINEDEVICE CO., LTD., Minamitsuru-gun, Yamanashi (JP); CITIZEN HOLDINGS CO., LTD., Tokyo (JP)

(72) Inventors: Rikoku Nakamura, Yamanashi (JP); Masanori Yomoyama, Yamanashi (JP); Hitoshi Satsuta, Yamanashi (JP)

(73) Assignees: CITIZEN FINEDEVICE CO., LTD., Yamanashi (JP); CITIZEN WATCH CO., LTD., Tokyo (JP)

( * ) Notice: Subject to any disclaimer, the term of this patent is extended or adjusted under 35 U.S.C. 154(b) by 192 days.

(21) Appl. No.: 15/129,659

(22) PCT Filed: Mar. 25, 2015

(86) PCT No.: PCT/JP2015/059134
§ 371 (c)(1),
(2) Date: Sep. 27, 2016

(87) PCT Pub. No.: WO2015/147058
PCT Pub. Date: Oct. 1, 2015

(65) Prior Publication Data
US 2017/0146421 A1    May 25, 2017

(30) Foreign Application Priority Data
Mar. 27, 2014   (JP) ................ 2014-067063

(51) Int. Cl.
*G01L 1/00*    (2006.01)
*G01L 1/16*    (2006.01)
(Continued)

(52) U.S. Cl.
CPC ........... *G01L 23/10* (2013.01); *F02D 35/023* (2013.01)

(58) Field of Classification Search
CPC ... G01L 1/00; G01L 1/16; G01L 23/00; G01L 23/10; F02D 35/023
See application file for complete search history.

(56) References Cited

U.S. PATENT DOCUMENTS

| 6,427,539 B1 * | 8/2002 | Chen ............... G01L 9/0064 73/726 |
| 2009/0052699 A1 * | 2/2009 | Andersen ............ H04R 17/02 381/173 |

FOREIGN PATENT DOCUMENTS

| EP | 0316257 A2 * | 5/1989 | ........... F02M 65/003 |
| JP | 1-272304 A | 10/1989 | |

(Continued)

OTHER PUBLICATIONS

International Search Report, issued in PCT/JP2015/059134, dated Apr. 21, 2015.

*Primary Examiner* — Nguyen Ha
(74) *Attorney, Agent, or Firm* — Birch, Stewart, Kolasch & Birch, LLP (57) ABSTRACT

There is provided a pressure detection device (10) including: a pressure detection element (21) which receives pressure (P) so as to output a detection signal (Qi) corresponding to the pressure (P); and a processing circuit (30) which processes and outputs the detection signal (Qi) output from the pressure detection element (21), where on a circuit board (40) on which a conductor pattern is formed, an integrated circuit (IC1) including an analog circuit which uses a reference voltage (Vr) set to a predetermined voltage value as an operation reference and converts the detection signal (Qi) into a voltage waveform is mounted, and the processing circuit (30) includes an input circuit 50 which feeds the detection signal (Qi) to the integrated circuit (IC1) and a (Continued)

shield pattern (SHP1) which surrounds the region of at least a part of the input circuit (50) and to which the reference voltage (Vr) is applied.

14 Claims, 5 Drawing Sheets

(51) Int. Cl.
*G01L 23/10* (2006.01)
*F02D 35/02* (2006.01)

(56) References Cited

FOREIGN PATENT DOCUMENTS

| | | |
|---|---|---|
| JP | 2003-307527 A | 10/2003 |
| JP | 2010-135555 A | 6/2010 |

\* cited by examiner

PRESSURE DETECTION DEVICE

TECHNICAL FIELD

The present invention relates to a pressure detection device which is suitably used when pressure such as the combustion pressure of an engine is detected.

BACKGROUND ART

In general, various detection devices are proposed which detect physical amounts such as pressure and magnetism and convert them into electrical signals. Since in such a detection device, a sensor outputs a variation in the physical amount as a differential value, the detection device includes a processing circuit for converting, by integration with an integrator circuit, a detection signal from the sensor into the voltage of a waveform similar to the variation in the physical amount.

Figure 8:
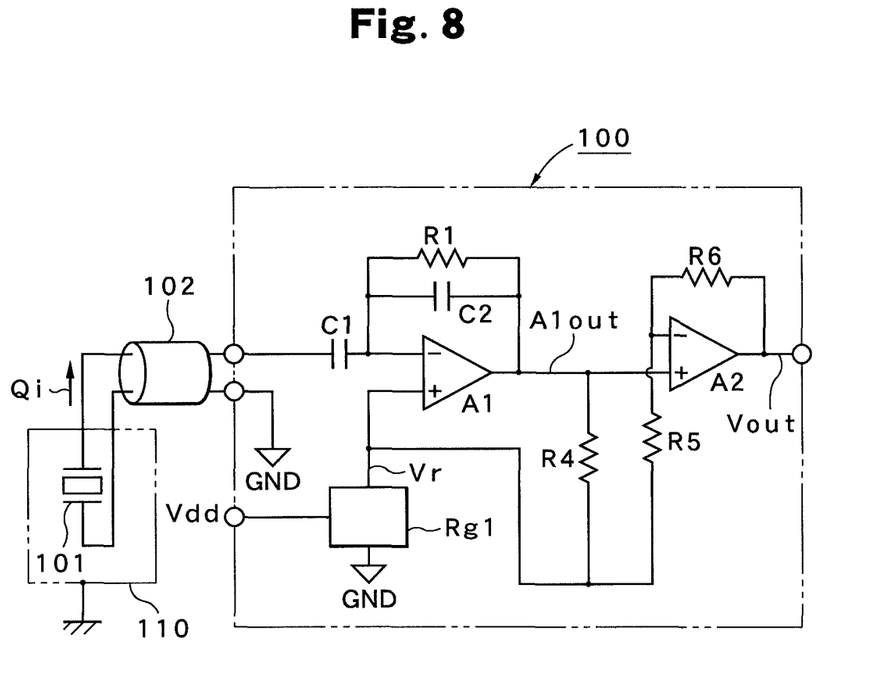
FIG. 8 is a schematic circuit diagram of the processing circuit of a pressure detection device according to conventional background.

FIG. 8 shows an example of a processing circuit in a pressure detection device which detects, as a physical amount, the combustion pressure of an engine. In FIG. 8, the processing circuit 100 is formed with two operational amplifiers A1 and A2 which are an integrator circuit that integrates a detection signal and an amplifier circuit that amplifies an output signal obtained by the integration. One terminal of a piezoelectric element 101 which detects pressure is connected through a conductive member 102 via the input capacitor C1 of the processing circuit 100 to the inverting input terminal of the operational amplifier A1. The other terminal of the piezoelectric element 101 is connected through the conductive member 102 to the GNU of the processing circuit 100. In this way, a charge signal Qi from the piezoelectric element 101 is fed to the inverting input terminal of the operational amplifier A1.

On the other hand, a reference voltage Vr from a reference power supply Rg1 formed with a regulator is fed to the non-inverting input terminal of the operational amplifier A1. An external power supply Vdd is input to the reference power supply Rg1, and thus the reference power supply Rg1 outputs the stable reference voltage Vr. Between the inverting input terminal of the operational amplifier A1 and the output terminal of the operational amplifier A1, a charge capacitor C2 and a discharge resistor R1 are connected. An output signal A1out obtained by integrating the charge signal Qi to convert it into a voltage is obtained from the output terminal of the operational amplifier A1.

The output signal A1out is fed to the non-inverting input terminal of the operational amplifier A2 which is an amplifier circuit. The non-inverting input terminal is connected through a resistor R4 to the reference voltage Vr. The non-inverting input terminal of the operational amplifier A2 is connected through a resistor R5 to the reference voltage Vr and is connected through a resistor R6 to the output terminal. In this way, it is possible to obtain an amplified output signal Vout from the output terminal of the operational amplifier A2.

On the other hand, the piezoelectric element 101 is stored in the enclosure 110 of the detection device, and the enclosure 110 is grounded (earth) in common with the engine (not shown) when a combustion pressure sensor for detecting the combustion pressure of the engine is used. The reason why the inputs of the integrator circuit of the operational amplifier A1 and the amplifier circuit of the operational amplifier A2 are connected to the reference voltage Vr is that single-power supply drive (the power supply Vdd) is adopted to simplify the power supply of the processing circuit 100 and hence as a reference for operating the operational amplifiers A1 and A2, an intermediate voltage between the power supply Vdd and the GND is needed. In the illustrated case, power supply Vdd=DC+5V and reference voltage Vr=DC+1V.

The basic operation of the pressure detection device will then be described with reference to FIG. 9. FIG. 9(a) schematically shows the differentiated waveform of the charge signal Qi with respect to a time t when the piezoelectric element 101 detects a variation in the combustion pressure at a period TO. The charge signal Qi is fed through the input capacitor C1 shown in FIG. 8 to the inverting input terminal of the operational amplifier A1 in the processing circuit 100.

Figure 9:
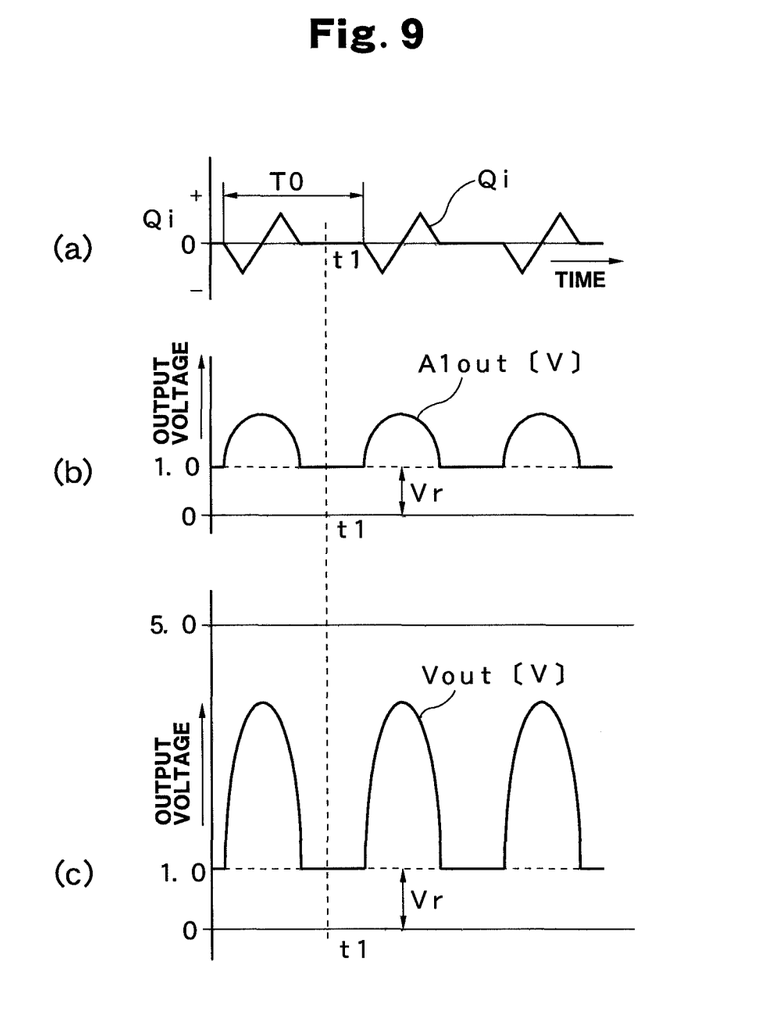
FIG. 9 is a waveform diagram illustrating the operation of the pressure detection device.

FIG. 9(b) shows an example of the voltage waveform of the output signal A1out output from the output terminal of the operational amplifier A1. Since the operational amplifier A1 is operated with reference to the reference voltage Vr, the charge signal Qi is converted by integration into voltage, and the output signal A1out similar to a variation in the voltage is obtained from the output terminal of the operational amplifier A1. Since the operational amplifier A1 uses the reference voltage Vr as an operation reference, for example, when the charge signal Qi is not present such as at time t1, the voltage level of the output signal A1out is essentially equal to the reference voltage Vr (in the illustrated case, DC 1V).

FIG. 9(c) shows an example of the voltage waveform of the output signal Vout output from the output terminal of the operational amplifier A2. Here, the operational amplifier A2 is operated as a non-inverting amplifier circuit which uses the reference voltage Vr as an operation reference, the output signal Vout thereof is in phase with the output signal A1out which is input and the amplitude thereof has a magnitude which is amplified at a predetermined amplification factor. Since the operational amplifier A2 also uses the reference voltage Vr as an operation reference, for example, when the output signal A1out which is input is not present as at time t1, the voltage level of the output signal Vout is essentially equal to the reference voltage Vr (in the illustrated case, DC 1V).

In this case, since the piezoelectric element 101 serving as a pressure detection element has an extremely high direct-current impedance, and the amount of charge of the charge signal Qi serving as the detection signal is low, as the operational amplifier A1 to which the charge signal Qi is fed, an operational amplifier which has performance of an extremely high input impedance is needed, and the charge capacitor C2 and the discharge resistor R1 also need to have high impedances. In this way, the input circuit of the operational amplifier A1, that is, the circuit which includes the inverting input terminal of the operational amplifier A1, the input capacitor C1, the charge capacitor C2 and the discharge resistor R1, has an impedance higher than a peripheral circuit, and has the characteristic of being easily affected by induction noise and leakage current from the outside.

If induction noise from the outside is input to the input circuit of the operational amplifier A1 in a mixed manner, a large error occurs in the output signal A1out since the noise component of operational amplifier A1 is integrated together with the charge signal Qi. If the leakage current is passed from the input circuit of the operational amplifier A1 to the power supply Vdd and the GND in the vicinity thereof, a direct-current offset voltage is produced in the output signal A1out of the operational amplifier A1, with the result that, in the worst case, there is a danger that the potential of the output signal A1out exceeds the power supply Vdd or the GND. Hence, in order to highly accurately integrate the charge signal Qi to convert it into a voltage waveform, it is significantly important that the input circuit of the operational amplifier A1 should minimize influences of induction noise and leakage current.

Under the foregoing circumstances, in a high-impedance circuit, a high-speed signal circuit and the like, it is necessary to take the measure of reducing the influences of induction noise and leakage current, and hence, various noise reduction measures are conventionally proposed.

For example, patent literature 1 discloses a semiconductor device which includes a shield means for the wiring of a multi-pin LSI. In particular, in the shield means, a guard ring is provided so as to surround a high-speed signal line which is easily affected by noise, the number of power supply terminals connected to the guard ring is set lower than the number of high-speed signal terminals and furthermore, the width of the wiring of the guard ring is changed according to the distance and route from the power supply terminal, in an attempt to improve the uniformity of the current flowing through the guard ring.

Patent literature 2 discloses a probe card which uses a multilayer substrate. In the probe card, the multilayer substrate is used to cover, for a signal line, a guard line whose potential is equal to that of the signal line both in the planar direction and the vertical direction of the multilayer substrate and furthermore, a GND line is arranged outside it. In this way, a signal which has the same potential as the signal line whose impedance is lowered by an amplifier is supplied to the guard line, and thus the occurrence of a leakage current is reduced by the guard line, with the result that it is possible to obtain a shield effect resulting from the GND line.

CITATION LIST

Patent Literature

JP-No. 2010-135555
JP-No. 2003-307527

SUMMARY OF INVENTION

Technical Problem

However, in the conventional noise reduction means disclosed in patent literatures 1 and 2 described above, the following problems are present.

The shield means included in the semiconductor device disclosed in patent literature 1 is a shield means for the wiring of a multi-pin LSI, and thus the application range thereof is narrow. Although the uniformity of the current flowing through the shield line is attempted to be improved by changing the width of the wiring according to the distance of the shield line, it is impossible to reduce the influences of noise by the uniformity of the current flowing through the shield line, with the result that it is impossible to anticipate the shield means particularly as a noise reduction means for a high-impedance circuit. Moreover, when there is a potential difference between the signal line and the shield line, leakage current flows from the signal line to the shield line, and thus an error occurs in the signal waveform of the signal line, with the result that it is impossible to perform accurate signal detection.

On the other hand, in the probe card disclosed in patent literature 2, a double-structure shield form is adopted in which the signal line of the probe is covered with the guard line and the outside thereof is covered with the GND line, and the signal which has the same potential as the signal line whose impedance is lowered by an amplifier is supplied to the guard line, with the result that when the detected voltage waveform is produced in the signal line, the voltage waveform of the same level is produced in the guard line. Here, since the signal line has a high impedance, and the guard line has a low impedance, the signal line is so affected by the guard line as to be positively fed back. Consequently, distortion and linking occur in the signal waveform, and thus in the worst case, there is a danger that an oscillation occurs. Hence, there is a danger that in the guard line, as compared with the effect of removing the leakage current, significant negative side effects such as a distortion, linking in the signal waveform and an oscillation are produced.

An objective of the present invention is to provide a pressure detection device which solves the forgoing problems present in the background technology.

Solution to Problem

In order to solve the foregoing problems, according to the present invention, there is provided a pressure detection device 10 which includes: a pressure detection element 21 which receives pressure P so as to output a detection signal Qi corresponding to the pressure P; and a processing circuit 30 which processes and outputs the detection signal Qi output from the pressure detection element 21, where on a circuit board 40 on which a conductor pattern is formed, an integrated circuit IC1 including an analog circuit which uses a reference voltage Vr set to a predetermined voltage value as an operation reference and which converts the detection signal Qi into a voltage waveform is mounted, and the processing circuit 30 includes an input circuit 50 which feeds the detection signal Qi to the integrated circuit IC1 and a shield pattern SHP1 which surrounds the region of at least a part of the input circuit 50 and to which the reference voltage Vr is applied.

In this case, according to a preferred aspect of the invention, the integrated circuit IC1 includes at least one input terminal LA-IN from which the detection signal Qi is input and a shield terminal L-SH1 adjacent to the input terminal LA-IN. The shield pattern SHP1 can be electrically connected to the shield terminal L-SH1 and can be formed in the shape of a frame which surrounds the region of at least a part of the input circuit 50 including the input terminal LA-IN. Here, the shield pattern SHP1 can be arranged in a gap between lands on which components included in the input circuit 50 are mounted. Furthermore, the reference voltage Vr can be set to the intermediate value of a power supply Vdd, and the reference voltage Vr can be applied through a protective resistor R3 to the shield pattern SHP1. On the other hand, the circuit board 40 is a back surface layer 44 corresponding to a front surface layer 41 on which the integrated circuit IC1 is mounted, and the shield pattern SHP4 to which the reference voltage Vr is applied can be formed in a back surface region opposite the region of at least a part of the input circuit 50. The circuit board 40 can be formed with a multilayer board, and the shield patterns SHP2 and SHP3 to which the reference voltage Vr is applied can be formed in an inner surface region which is inner surface layers 42 and 43 in the circuit board 40 and is opposite the region of at least a part of the input circuit 50. On the other hand, the analog circuit can include an integrator circuit which performs integration processing on the detection signal Qi, and the integrator circuit can be formed with a computation amplifier circuit A1 which is operated with a single power supply. The pressure detection device 10 is suitably used when the combustion pressure P of the engine 1 mounted on an automobile is detected.

Advantageous Effects of Invention

In the pressure detection device 10 according to the present invention and configured as described above, as the basic configuration, on the circuit board 40 on which the conductor pattern is formed, the integrated circuit IC1 including the analog circuit which uses the reference voltage Vr set to the predetermined voltage value as the operation reference and which converts the detection signal Qi into the voltage waveform is mounted, and the processing circuit 30 includes the input circuit 50 which feeds the detection signal Qi to the integrated circuit IC1 and the shield pattern SHP1 which surrounds the region of at least a part of the input circuit 50 and to which the reference voltage Vr is applied. Hence, the input circuit 50 with high impedance is surrounded by the shield pattern SHP1 to which the reference voltage Vr serving the operation reference when the detection signal Qi is converted is applied. Consequently, the leakage current of the input circuit 50 in the pressure detection device 10 for detecting the pressure P as the physical amount is reduced, and the influence of the external noise is reduced, with the result that it is possible to realize highly accurate pressure detection with few errors.

REFERENCE SIGNS LIST

10: pressure detection device, P: pressure (combustion pressure), 21: pressure detection element, 30: processing circuit, 40: circuit board, 41: front surface layer, 42: inner surface layer, 43: inner surface layer, 44: back surface layer, 50: input circuit, Qi: detection signal, Vr: reference voltage, IC1: integrated circuit, SHP1: shield pattern, SHP2: shield pattern, SHP3: shield pattern, SHP4: shield pattern, LA-IN: input terminal, L-SH1: shield terminal, L-SH2: shield terminal, Vdd: power supply, R3: protective resistor, A1: computation amplifier circuit, 1: engine

DESCRIPTION OF EMBODIMENTS

A preferred embodiment according to the present invention will then be described with reference to drawings.

First, in order for a pressure detection device according to the present invention to be easily understood, an example of the configuration of an engine to which the pressure detection device is fitted will be described with reference to FIG. 1.

Figure 1:
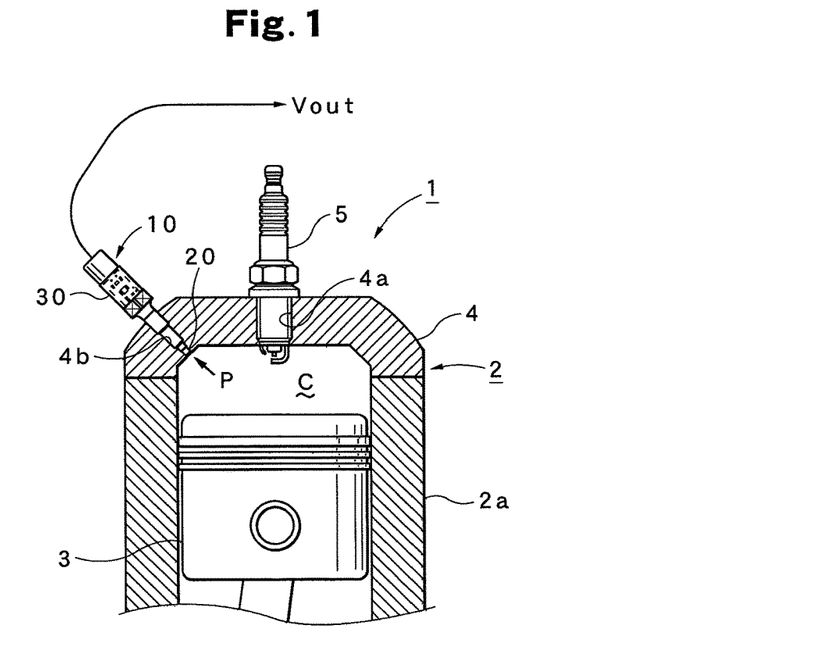
FIG. 1 is a schematic configuration diagram showing an engine to which a pressure detection device according to a preferred embodiment of the present invention is fitted.

The engine 1 illustrated in FIG. 1 is an engine (internal combustion engine) which is mounted on an automobile, and the pressure detection device 10 fitted to the engine has the function of detecting the combustion pressure of the engine 1. The engine 1 includes a cylinder block 2 which has a cylinder 2a, a piston 3 which reciprocates within the cylinder 2a and a cylinder head 4 which is coupled to the cylinder block 2 and which forms a combustion chamber C together with the cylinder 2a, the piston 3 and the like.

In the cylinder head 4, a communication hole 4a is provided, and a spark plug 5 which performs ignition for detonating an air-fuel mixture within the combustion chamber C is fitted. Furthermore, in another position of the cylinder head 4, a communication hole 4b is provided, and the pressure detection device 10 according to the present invention is fitted. Although not illustrated, a fuel injection device which injects fuel into the combustion chamber C is fitted to the cylinder head 4.

The pressure detection device 10 is formed in the shape of a cylinder, the pressure detection device 10 fitted to the communication hole 4b penetrates the cylinder head 4 and a detection portion 20 at the tip end faces the interior of the combustion chamber C so as to detect internal pressure (combustion pressure: arrow P). A processing circuit 30 which performs processing on a detection signal from the detection portion 20 and outputs it is incorporated in the pressure detection device 10, and an output signal Vout is fed from the processing circuit 30 to an external engine control portion (not shown).

Figure 2:
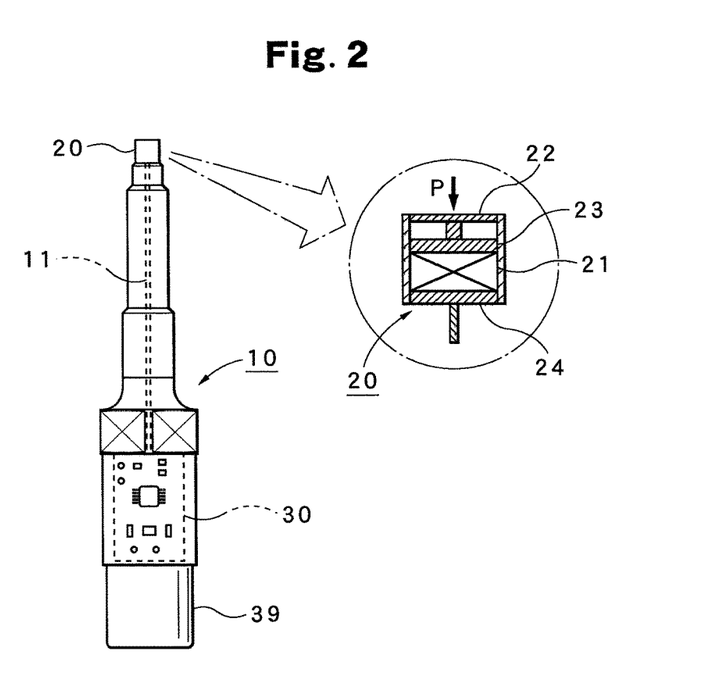
FIG. 2 is a side view showing an overall configuration of the pressure detection device and an enlarged cross-sectional view of a detection portion.

The schematic mechanical configuration of the pressure detection device 10 will then be described with reference to FIG. 2. In FIG. 2, the tip end of the pressure detection device 10 located in the upper portion of the figure is formed in the shape of a thin cylinder, and the detection portion 20 for detecting the combustion pressure is provided at the tip end. In the vicinity of the lower end of the pressure detection device 10 located in a lower portion in the figure, the processing circuit 30 is incorporated, and the processing circuit 30 and the detection portion 20 are connected with a conductive member 11 which transmits the detection signal from the detection portion 20.

The processing circuit 30 incorporates a plurality of electronic components which are shown as a perspective view. In the processing circuit 30, a connector portion 39 is arranged adjacent thereto, and the connector portion 39 includes an unillustrated connector terminal for outputting the output signal Vout (see FIG. 1) from the processing circuit 30 to the outside.

The figure shown in FIG. 2 and enclosed by a circle is an enlarged cross-sectional view of the detection portion 20 located at the tip end of the pressure detection device 10 taken along a line in the length direction thereof. At the uppermost tip end portion of the detection portion 20, a diaphragm 22 is provided, a base 23 is in close contact with the diaphragm 22, and a piezoelectric element 21 serving as a pressure detection element is in close contact with the base 23. When combustion pressure P is produced, in this way, within the combustion chamber C shown in FIG. 1, a displacement in the diaphragm 22 receiving the combustion pressure P is transmitted through the base 23 to the piezoelectric element 21 as a compression force, the piezoelectric element 21 receiving the compression force generates a charge signal and the charge signal is transmitted to the processing circuit 30 through the conductive member 11 connected to an electrode 24.

As described above, in the pressure detection device 10 described in the embodiment, the detection portion 20 and the processing circuit 30 are integrally formed, and the pressure detection device 10 is fitted to the engine 1 as an independent pressure detection device 10, with the result that the pressure detection device 10 is easily fitted and its maintainability is excellent.

Figure 3:
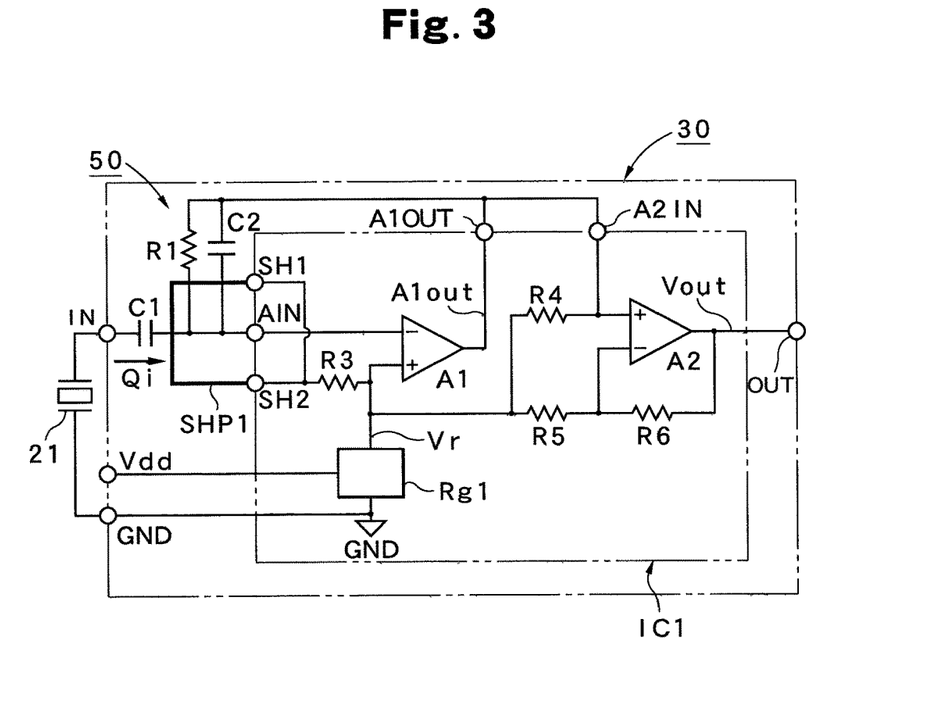
FIG. 3 is a schematic circuit diagram of a processing circuit in the pressure detection device.

The circuit configuration of the processing circuit 30 in the pressure detection device 10 according to the present embodiment will then be described with reference to FIG. 3. In FIG. 3, the processing circuit 30 is formed with a detection circuit IC1 which is an analog integrated circuit, a plurality of capacitors and resistors and the like. In this case, since the basic configuration parts of the processing circuit 30 are the same as the processing circuit 100 in FIG. 8 described previously, the same elements are identified with the same numbers, and the repeated description will be partially omitted.

The processing circuit 30 includes terminals for a power supply Vdd which is supplied from the outside and a ground GND. The processing circuit 30 also includes an input IN which is connected to one terminal of the piezoelectric element 21 and to which a charge signal Qi serving as the detection signal is input, and the other terminal of the piezoelectric element 21 is connected to the GND. The conductive member 11 described previously, which is between the piezoelectric element 21 and the processing circuit 30, is not illustrated. Furthermore, the processing circuit 30 includes a terminal OUT from which the output signal Vout is output.

The detection circuit IC1 incorporates two operational amplifiers (computation amplifier circuits) A1 and A2 which are analog circuits that are operated by the power supply Vdd serving as a single power supply and a reference power supply Rg1 formed with a regulator. As in FIG. 8, the operational amplifier A1 functions as an integrator circuit which inputs and integrates the charge signal Qi serving as the detection signal and converts it into a voltage waveform. The operational amplifier A2 functions as an amplifier circuit which feeds the output signal A1out of the operational amplifier A1 and amplifies it. Furthermore, the power supply Vdd is fed to the reference power supply Rg1, and thus the reference power supply Rg1 outputs a reference voltage Vr which has a predetermined voltage value. The reason why the detection circuit IC1 incorporates the reference power supply Rg1 is the same as the processing circuit 100 shown in FIG. 8. In the illustrated case, power supply Vdd=DC+5V and reference voltage Vr=DC+1V.

The input terminal AIN of the detection circuit IC1 is connected to the inverting input terminal of the operational amplifier A1 within the detection circuit IC1. The input terminal AIN is connected to one terminal of the input capacitor C1 outside the detection circuit IC1, and the other terminal of the input capacitor C1 is connected to the input IN of the processing circuit 30. Furthermore, outside the detection circuit IC1, the input terminal AIN of the detection circuit IC1 is connected both to the charge capacitor C2 and to one terminal of the discharge resistor R1, and the charge capacitor C2 and the other terminal of the discharge resistor R1 are connected to the output terminal A1OUT of the operational amplifier A1. On the other hand, the non-inverting input terminal of the operational amplifier A1 is connected to the reference voltage Vr which is the output of the reference power supply Rg1. In the configuration described above, the operational amplifier A1 of the detection circuit IC1 functions as the integrator circuit which integrates the charge signal Qi fed from the input IN and which converts it into a voltage waveform.

In this case, the charge capacitor C2 and the discharge resistor R1 are set at a capacitance value and a resistance value such that when a predetermined combustion pressure P is added to the piezoelectric element 21, the output signal A1 out of the operational amplifier A1 has an appropriate magnitude. Since the charge capacitor C2 and the discharge resistor R1 form a high pass filter, at the time constant RC thereof, a value which is sufficiently long when compared with the frequency range of the combustion pressure P to be detected needs to be selected.

In this way in particular, the discharge resistor R1 selects an extremely high resistance value, and as described previously, the input impedance of the operational amplifier A1 is also a high value, and thus the wiring of the input terminal AIN of the detection circuit IC1 and the input capacitor C1, the charge capacitor C2 and the discharge resistor R1 connected to the input terminal AIN have a high impedance as in the processing circuit 100 shown in FIG. 8. In the following description, a circuit which includes the input terminal AIN of the detection circuit IC1, the input capacitor C1, the charge capacitor C2, the discharge resistor R1 and the wiring connecting these electronic components (conductor pattern) is defined as a high-impedance input circuit (abbreviated as a HI input circuit) 50. When the HI input circuit (or the input terminal) 50 is mentioned, it is a conception which includes both the whole and part thereof.

The detection circuit IC1 includes two shield terminals SH1 and SH2 adjacent to the input terminal AIN. In other words, the shield terminals SH1 and SH2 are arranged to sandwich the input terminal AIN, and the shield terminals SH1 and SH2 are connected to the reference voltage Vr through a protective resistor R3 within the detection circuit IC1. The reason why the shield terminals SH1 and SH2 are connected to the reference voltage Vr through the protective resistor R3 is that the reference power supply Rg1 is prevented from being destroyed by electrostatic discharge (ESD) via the shield terminals SH1 and SH2 so as to be protected. Here, when the resistance value of the protective resistor R3 is excessively high, a shield effect against noise which will be described later is reduced whereas when the resistance value is excessively low, an ESD protection effect is reduced, with the result that as an example, about 10 K ohm is preferable.

On the other hand, outside the detection circuit IC1, the shield terminals SH1 and SH2 are connected to a shield pattern SHP1 (thick lines in the figure) formed on the front surface layer of a circuit board, and thus the shield pattern SHP1 is arranged so as to surround the HI input circuit 50 described previously. The shield pattern SHP1 will be described in detail later.

Outside the detection circuit IC1, the non-inverting external input terminal A2IN of the operational amplifier A2 is connected to the output terminal A1OUT of the operational amplifier A1, and thus the output signal A1out of the operational amplifier A1 is fed to the non-inverting input terminal of the operational amplifier A2. Furthermore, the non-inverting input terminal of the operational amplifier A2 is connected through the resistor R4 to the reference voltage Vr, and the inverting input terminal of the operational amplifier A2 is connected through the resistor R5 to the reference voltage Vr. The inverting input terminal and the output terminal of the operational amplifier A2 are connected through a resistor R6.

In the configuration described above, the operational amplifier A2 functions as a non-inverting amplifier circuit, amplifies the output signal A1out fed from the operational amplifier A1 at a predetermined amplification factor and outputs the output signal Vout from the output terminal. The output signal Vout is output from the output OUT of the processing circuit 30 and is transmitted to the engine control portion of the engine 1 which is not illustrated. In this case, the amplification factor of the operational amplifier A2 is determined by the ratio between the resistance values of the resistors R5 and R6. When the voltage level of the output signal A1out of the operational amplifier A1 is a sufficient level, the operational amplifier A2 serving as the amplifier circuit can be omitted.

The operation of the processing circuit 30 will then be described with reference to FIG. 3. Since the basic operation of the processing circuit 30 is the same as the operation of the processing circuit 100 in the pressure detection device shown in FIG. 9, the repeated description of the output waveform and the like will be omitted, and the function and effects of the shield pattern SHP1 surrounding the HI input circuit 50 which is the characteristic part of the present invention will be mainly described.

In FIG. 3, the input terminal AIN of the integrator circuit of the operational amplifier A1 in the detection circuit IC1 and the peripheral circuit thereof, that is, the HI input circuit 50, are surrounded by the shield pattern SHP1 formed on the front surface layer of the circuit board. As described previously, the HI input circuit 50 has the characteristic of being easily affected by induction noise and leakage current from the outside. On the other hand, since the non-inverting input terminal of the operational amplifier A1 is connected to the reference voltage Vr, the operational amplifier A1 is operated with reference to the reference voltage Vr. In this way, when the charge signal Qi is not present as at time t1 in FIG. 9(a), the direct-current potential of the HI input circuit 50 with the inverting input terminal of the operational amplifier A1, that is, the input terminal AIN in the center is essentially equal to the reference voltage Vr (for example, DC 1V).

In this case, since the shield pattern SHP1 is connected to the reference voltage Vr which is the operation reference of the operational amplifier A1, the HI input circuit 50 of the operational amplifier A1 surrounded by the shield pattern SHP1 is surrounded by the shield pattern SHP1 to which the reference voltage Vr which has the same potential is connected. Consequently, even when leakage current attempts to flow from the HI input circuit 50 with a high impedance to the power supply Vdd (5V) or the GND (0V) with a potential difference, since the HI input circuit 50 is surrounded by the shield pattern SHP1 which has the same potential, a route along which the leakage current flows from the HI input circuit 50 is guarded by the shield pattern SHP1. In this way, almost no leakage current flows, and thus it is possible to reliably reduce the influence of leakage current on the operational amplifier A1. Since the potential of the output signal A1out of the operational amplifier A1 when the charge signal Qi is not present is substantially equal to the reference voltage Vr as at time t1 in FIG. 9(a), an offset voltage is produced in the output signal A1out by the influence of leakage current, and thus it is possible to avoid a failure in which an error occurs in the pressure detection.

Furthermore, since as described previously, the reference voltage Vr is generated by the reference power supply Rg1 formed with the regulator, the output impedance thereof is a low impedance. Consequently, the HI input circuit 50 is surrounded by the shield pattern SHP1 to which the reference voltage Vr which has a low impedance is applied, and even when induction noise or the like enters from the outside, the HI input circuit 50 is guarded by the shield pattern SHP1 which has a low impedance, with the result that it is possible to reduce the entrance of noise into the HI input circuit 50 in a mixed manner.

As described above, although the integrator circuit of the operational amplifier A1 is formed with the input circuit 50 which has the characteristic of a high impedance, the HI input circuit 50 is surrounded by the shield pattern SHP1 to which the reference voltage Vr is applied, and thus it is possible to reduce the influences of leakage current and external noise and to realize a highly accurate integration operation with few errors, making it possible to provide a pressure detection device with excellent detection accuracy. A shield pattern is also formed on another layer of the circuit board to cover the HI input circuit 50, and the configuration of the shield pattern will be described in detail later.

Figure 4:
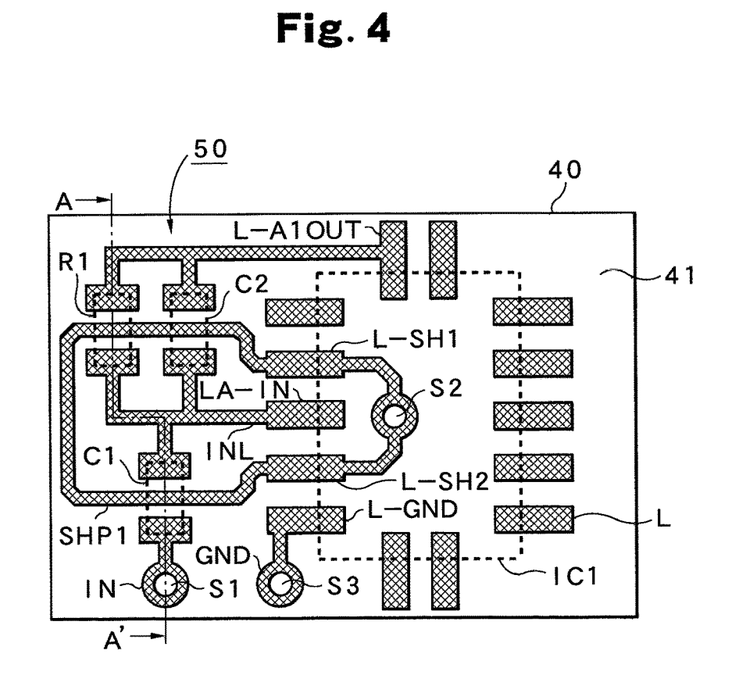
FIG. 4 is a conductor pattern diagram showing an example of the front surface layer of a circuit board in the processing circuit.

The conductor pattern on the front surface layer of the circuit board 40 in the processing circuit 30 will then be described with reference to FIG. 4. The circuit configuration of the processing circuit 30 will be described with reference to FIG. 3. In FIG. 4, symbol 40 represents the circuit board on which the electronic components of the processing circuit 30 are mounted. The circuit board 40 which is shown as an example is a four-layer board, and in the illustrated case, on the front surface layer 41 on which the electronic components are mounted, the conductor pattern is formed with a copper foil or the like. FIG. 4 mainly shows the conductor pattern around the HI input circuit 50 of the detection circuit IC1, and since the other portions are not directly related to the present invention, they are not illustrated.

The detection circuit IC1 indicated by broken lines includes a package for surface mounting, in the positions of the front surface layer 41 corresponding to unillustrated input and output terminals, a plurality of lands L of the conductor pattern are formed and the detection circuit IC1 is mounted by solder or the like (not shown). In the figure, L-AIN represents a land corresponding to the input terminal AN of the detection circuit IC1, L-SH1 represents a land corresponding to the shield terminal SH1 of the detection circuit IC1 and L-SH2 represents a land corresponding to the shield terminal SH2 of the detection circuit IC1.

As shown in FIG. 4, the land L-AIN is continuously formed, through the wiring of the conductor pattern, on the lands of the electrodes of the input capacitor C1, the charge capacitor C2 and the discharge resistor R1. The wiring of the conductor pattern from the land L-AIN forms an input line INL. The land of the other electrode of the input capacitor C1 is continuously formed on the conductor pattern surrounding a through hole S1. The through hole S1 forms the input IN of the processing circuit 30. Hence, although not illustrated, the signal line of the conductive member 11 on one side shown in FIG. 3 is connected to the input IN, and the charge signal Qi from the piezoelectric element 21 is input thereto.

On the other hand, the lands of the other electrodes of the charge capacitor C2 and the discharge resistor R1 are continuously formed on the land L-A1OUT through the illustrated conductor pattern. The land L-A1OUT is a land corresponding to the output terminal A1OUT of the operational amplifier A1 in the detection circuit IC1, and thus the charge capacitor C2 and the discharge resistor R1 are connected to the output terminal A1OUT of the operational amplifier A1 so as to form the integrator circuit of the operational amplifier A1.

The lands L-SH1 and L-SH2 are, as shown in the figure, continuously formed at both ends of the conductor pattern in the shape of a frame (in the shape of a ring). In this way, they are formed so as to surround the conductor pattern of the input line INL. The conductor pattern continuously formed on the lands L-SH1 and L-SH2 is the shield pattern SHP1 shown in FIG. 3, and is formed in the shape of a ring which surrounds the input line INL of the HI input circuit 50 through the gaps of the lands of the input capacitor C1, the charge capacitor C2 and the discharge resistor R1. As described above, the shield pattern SHP1 is formed on the front surface layer 41 of the circuit board 40 so as to surround the HI input circuit 50 in the shape of a frame, and thus it is possible to reduce the influences of leakage current and external noise.

On the other hand, a through hole S2 is continuously formed with the lands L-SH1 and LSH2 and the conductor pattern, and as will be described later, they are electrically connected with the through hole S2 to a shield pattern on another layer of the circuit board 40. A through hole S3 is the GND of the processing circuit 30 and is connected to the other signal line of the conductive member 11. The through hole S3 is connected with the land L-GND connected to the GND terminal of the detection circuit IC1 and the conductor pattern. Furthermore, as will be described later, the through hole S3 is electrically connected to the GND pattern of another layer of the circuit board 40.

Figure 5:
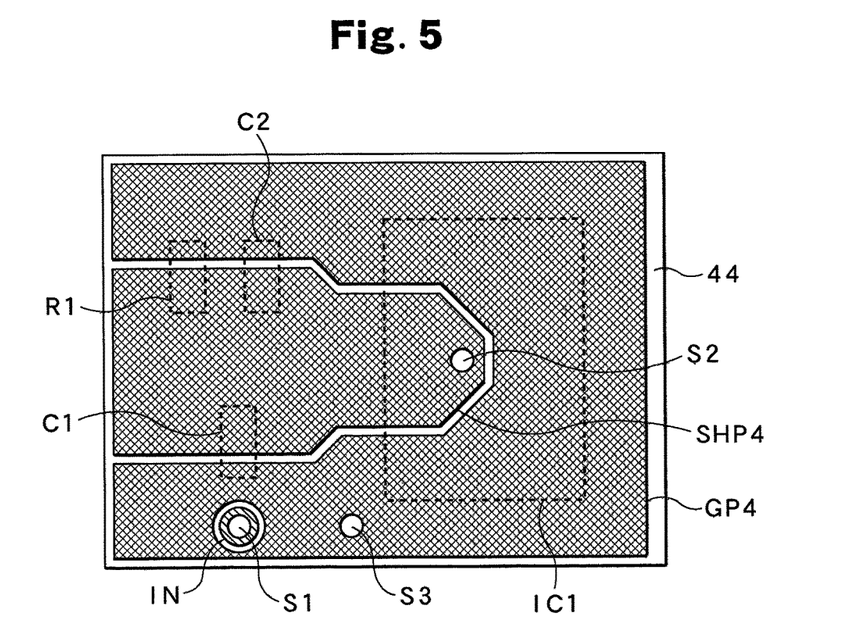
FIG. 5 is a conductor pattern diagram showing an example of the back surface layer of the circuit board in the processing circuit.
Figure 6:
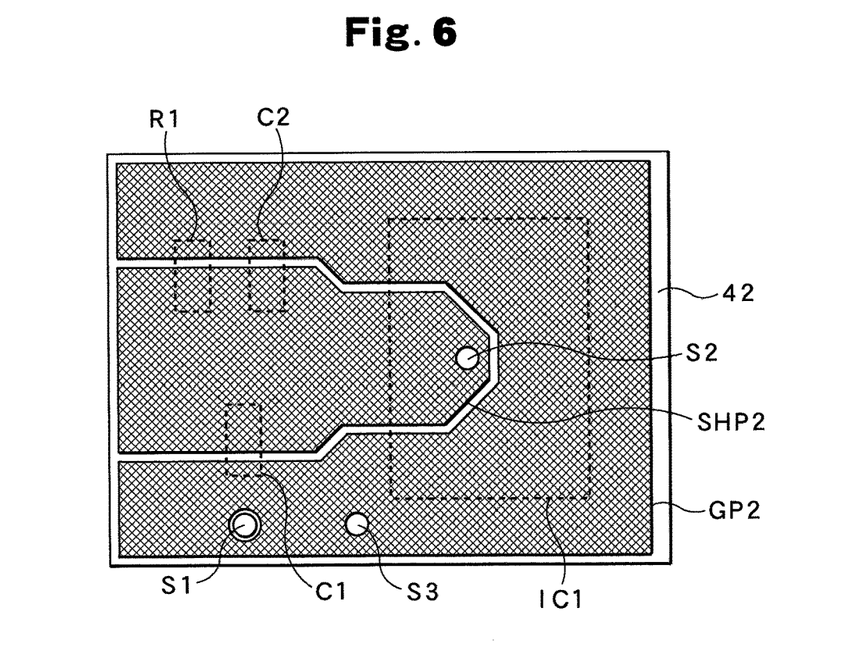
FIG. 6 is a conductor pattern diagram showing an example of the inner surface layer of the circuit board in the processing circuit.

A conductor pattern on a back surface layer of the circuit board 40 in the processing circuit 30 will then be described with reference to FIG. 5. FIG. 5 and FIG. 6 which will be described later are perspective views when seen from the side of the front surface layer 41 in the circuit board 40. In FIG. 5, the back surface layer 44 opposite the front surface layer 41 in the circuit board 40 is formed so as to be mostly covered with a planar GND pattern GP4 formed with the conductor pattern and a planar shield pattern SHP4. In this case, the shield pattern SHP4 covers, in a planar shape, the same region as the region (see FIG. 4) formed in the shape of a frame which surrounds the HI input circuit 50 with the shield pattern SHP1 on the front surface layer 41 in the circuit board 40.

Consequently, an area immediately below the region of the front surface layer 41 where the HI input circuit 50 is located is covered with the shield pattern SHP4 on the back surface layer 44. The shield pattern SHP4 is electrically connected through the through hole S2 to the lands L-SH1 and L-SH2 on the front surface layer 41. In this way, the reference voltage Vr of the detection circuit IC1 is applied to the shield pattern SHP4, and thus the input line INL which has a high impedance, that is, the area immediately below the region of the HI input circuit 50, is covered with the reference voltage Vr. The detection circuit IC1, the input capacitor C1, the charge capacitor C2 and the discharge resistor R1 indicated by broken lines indicate the respective positions in which they are mounted on the front surface layer 41.

Most of the regions other than the region of the shield pattern SHP4 are covered with the GND pattern GP4. However, the insulation between the input IN and the GND is held since the GND pattern GP4, which is cut out in a circle, is formed at a portion which is connected to the conductive member 11, and in which the through hole S1 of the input IN to which the charge signal Qi is input. Furthermore, the GND pattern GP4 is electrically connected through the through hole S3 to the GND of the front surface layer 41.

A conductor pattern on an inner surface layer of the circuit board 40 in the processing circuit 30 will then be described with reference to FIG. 6. FIG. 6 shows the conductor pattern of a first inner surface layer 42 close to the front surface layer 41, and the first inner surface layer 42 is formed so as to be mostly covered with a planar GND pattern GP2 formed with the conductor pattern and a planar shield pattern SHP2. In this case, the shield pattern SHP2 covers, in a planar shape, the same region as the region (see FIG. 4) formed in the shape of a frame which surrounds the HI input circuit 50 with the shield pattern SHP1 on the front surface layer 41 in the circuit board 40.

Consequently, the area immediately below the region of the front surface layer 41 where the HI input circuit 50 is located is covered with the shield pattern SHP2 on the first inner surface layer 42. The shield pattern SHP2 is electrically connected through the through hole S2 to the lands L-SH1 and L-SH2 on the front surface layer 41. In this way, the reference voltage Vr of the detection circuit IC1 is applied to the shield pattern SHP2, and thus the input line INL which has a high impedance, that is, the area immediately below the region of the HI input circuit 50, is covered with the reference voltage Vr. The detection circuit IC1, the input capacitor C1, the charge capacitor C2 and the discharge resistor R1 indicated by broken lines indicate the respective positions in which they are mounted on the front surface layer 41.

Although most of the regions other than the region of the shield pattern SHP4 are covered with the GND pattern GP4, since the GND pattern GP2 at the portion which is connected to the conductive member 11 and in which the through hole S1 of the input IN to which the charge signal Qi is input is formed is cut out in a circle, the insulation between the input IN and the GND is held. Furthermore, the GND pattern GP2 is electrically connected through the through hole S3 to the GND of the front surface layer 41.

Furthermore, on the side of the back surface layer 44 in the circuit board 40, a second inner surface layer 43 is formed so as to be mostly covered with a planar GND pattern GP3 formed with the conductor pattern and a planar shield pattern SHP3. Since the shape of the conductor pattern of the second inner surface layer 43 is formed in the same manner as the conductor pattern of the first inner surface layer 42 described previously, the description thereof will be omitted.

Figure 7:
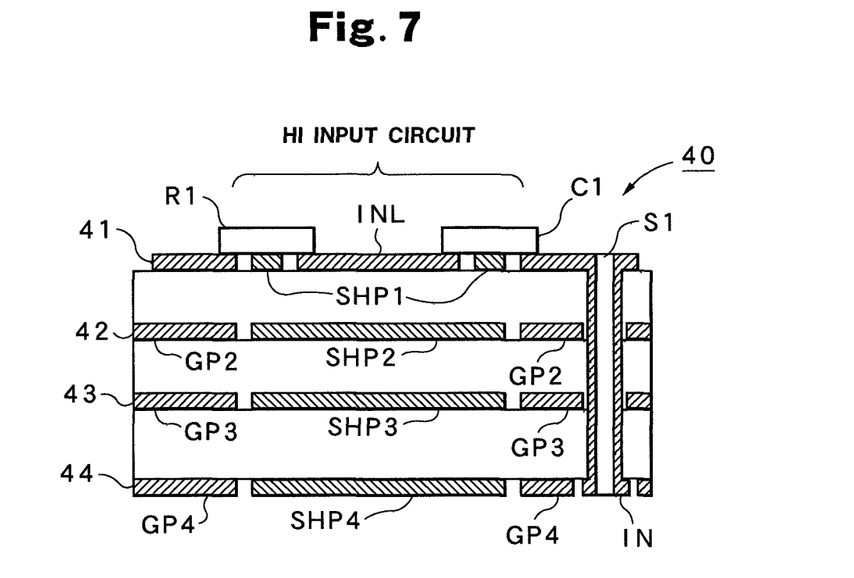
FIG. 7 is a cross-sectional view of the circuit board in the processing circuit taken along cut line A-A' shown in FIG. 4.

The cross-sectional structure of the circuit board 40 in the processing circuit 30 will then be described with reference to FIG. 7. FIG. 7 is a cross-sectional view of the circuit board 40 taken along cut line A-A' shown in FIG. 4. The circuit board 40 shown in FIG. 7 is the four-layer multilayer board described previously. The circuit board 40 is not limited to the four-layer board, and for example, when there is no problem on the wiring, the circuit board 40 may be a two-layer board formed with the front surface layer and the back surface layer or may be a multilayer board with four or more layers.

In this case, the input capacitor C1 and the discharge resistor R1 are mounted on the front surface layer 41 of the circuit board 40, and the two components are connected with the conductor pattern connected to the input terminal AIN, that is, the input line INL. Although not illustrated, the charge capacitor C2 is likewise connected to the input line INL (see FIG. 4). Immediately below the input capacitor C1 and the discharge resistor R1, the shield pattern SHP1 is passed through. In this way, the shield pattern SHP1 is shaped so as to surround the input line INL of the HI input circuit 50 in the planar direction of the circuit board 40.

Furthermore, in the first inner surface layer 42, the shield pattern SHP2 is formed immediately below the region of the HI input circuit 50 so as to cover the region of the HI input circuit 50. As in the first inner surface layer 42, in the second inner surface layer 43, the shield pattern SHP3 is formed immediately below the region of the HI input circuit 50 so as to cover the region of the HI input circuit 50. On the other hand, as in the first inner surface layer 42 and the second inner surface layer 43, in the back surface layer 44, the shield pattern SHP4 is formed immediately below the region of the HI input circuit 50 so as to cover the region of the HI input circuit 50. In this way, the region of the HI input circuit 50 on the front surface layer 41 is covered with the shield patterns SHP2, SH3 and SH4 in the vertical direction of the circuit board 40.

As shown in the figure, the through hole S1 penetrates the circuit board 40 and connects, with the conductor pattern, the input IN which is the conductor pattern of the back surface layer 44 and the input-side terminal of the input capacitor C1 on the front surface layer 41. In this way, the unillustrated conductive member 11 is connected by solder or the like, and thus the charge signal Qi from the conductive member 11 is transmitted to the input capacitor C1 mounted on the front surface layer 41. The method of connecting the conductive member 11 to the circuit board 40 is not limited to the illustrated method, and for example, a small connector or the like may be used.

As described above, the input circuit of the processing circuit 30 which has a high impedance, that is, the vicinity of the input line INL in the HI input circuit 50, is covered by surrounding the circuit board 40 in the planar direction with the shield pattern SHP1, and the circuit board 40 in the vertical direction is covered with the shield patterns SHP2, SHP3 and SHP4 in multiple layers.

In this way, as described previously, the reference voltage Vr which has a low impedance is applied to all of the shield patterns SHP1 to SHP4, and thus it is possible to prevent external induction noise and the like from entering the HI input circuit 50 in a mixed manner. Since the HI input circuit 50 is covered with the reference voltage Vr which is the operation reference of the operational amplifier A1 in the planar direction and in the vertical direction, the shield patterns SHP1 to SHP4 which have the same potential as the potential of the HI input circuit 50 serve as a guard, with the result that it is possible to prevent leakage current from flowing from the HI input circuit 50 to the power supply Vdd and the GND. Consequently, it is possible to provide a pressure detection device which can reduce the influences of external noise and leakage current and achieve highly accurate pressure detection with few errors.

Although the preferred embodiment is described in detail above, the present invention is not limited to such an embodiment, and modifications, additions and deletions can be arbitrarily performed on the detailed configurations, the shapes, the materials, the numbers, the methods and the like without departing from the spirit of the present invention.

For example, there are no limitations on the circuit diagrams, conductor pattern diagrams and the like shown in the embodiment, and they can be arbitrarily changed as long as they satisfy the spirit of the present invention. Although in this embodiment, the form in which the pressure detection device is independently fitted to the engine is described, the pressure detection device of the present invention is not limited to the form described above, and the present invention can be applied no matter how the pressure detection device is fitted to the engine.

INDUSTRIAL APPLICABILITY

The pressure detection device according to the present invention can be widely utilized for not only the detection of the combustion pressure of an engine but also pressure detection in various other applications.

The invention claimed is:

1. A pressure detection device comprising:
a pressure detection element which receives pressure so as to output a detection signal corresponding to the pressure; and
a processing circuit which processes and outputs the detection signal output from the pressure detection element,
wherein on a circuit board on which a conductor pattern is formed, an integrated circuit including an analog circuit which uses a reference voltage set to a predetermined voltage value as an operation reference and which converts the detection signal into a voltage waveform is mounted, and the processing circuit includes an input circuit which feeds the detection signal to the integrated circuit and a shield pattern which surrounds a region of at least a part of the input circuit and to which the reference voltage is applied.

2. The pressure detection device according to claim 1, wherein the integrated circuit includes at least an input terminal from which the detection signal is input and a shield terminal adjacent to the input terminal.

3. The pressure detection device according to claim 2, wherein the shield pattern is electrically connected to the shield terminal and is formed in a shape of a frame which surrounds a region of at least a part of the input circuit including the input terminal.

4. The pressure detection device according to claim 1, wherein the shield pattern is arranged in a gap between lands on which components included in the input circuit are mounted.

5. The pressure detection device according to claim 1, wherein the reference voltage is set to an intermediate value of a power supply.

6. The pressure detection device according to claim 1, wherein the reference voltage is applied through a protective resistor to the shield pattern.

7. The pressure detection device according to claim 1, wherein the circuit board is a back surface layer corresponding to a front surface layer on which the integrated circuit is mounted, and the shield pattern to which the reference voltage is applied is formed in a back surface region opposite the region of at least a part of the input circuit.

8. The pressure detection device according to claim 1, wherein the circuit board is formed with a multilayer board, and the shield pattern to which the reference voltage is applied is formed in an inner surface region which is an inner surface layer in the circuit board and which is opposite the region of at least a part of the input circuit.

9. The pressure detection device according to claim 1, wherein the analog circuit includes an integrator circuit which performs integration processing on the detection signal.

10. The pressure detection device according to claim 9, wherein the integrator circuit is formed with a computation amplifier circuit which is operated with a single power supply.

11. The pressure detection device according to claim 1, wherein the pressure detection device is applied to a pressure detection device which detects a combustion pressure of an engine mounted in an automobile.

12. The pressure detection device according to claim 2, wherein the shield pattern is arranged in a gap between lands on which components included in the input circuit are mounted.

13. The pressure detection device according to claim 3, wherein the shield pattern is arranged in a gap between lands on which components included in the input circuit are mounted.

14. The pressure detection device according to claim 5, wherein the reference voltage is applied through a protective resistor to the shield pattern.

* * * * *